(12) United States Patent
Takemura

(10) Patent No.: US 10,568,165 B2
(45) Date of Patent: Feb. 18, 2020

(54) METHOD FOR MANUFACTURING PLASTIC WINDOW

(71) Applicant: KABUSHIKI KAISHA TOYOTA JIDOSHOKKI, Kariya-shi, Aichi-ken (JP)

(72) Inventor: Kenji Takemura, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 349 days.

(21) Appl. No.: 15/622,465

(22) Filed: Jun. 14, 2017

(65) Prior Publication Data
US 2017/0367149 A1    Dec. 21, 2017

(30) Foreign Application Priority Data

Jun. 15, 2016 (JP) ................................ 2016-119233

(51) Int. Cl.
*H05B 3/86* (2006.01)
*B29C 45/16* (2006.01)
(Continued)

(52) U.S. Cl.
CPC ........... *H05B 3/86* (2013.01); *B29C 45/1671* (2013.01); *H05B 1/0236* (2013.01);
(Continued)

(58) Field of Classification Search
CPC .......... H05B 3/86; H05B 1/0236; H05B 3/06; H05B 3/02; H05B 3/84; H01R 4/02;
(Continued)

(56) References Cited

U.S. PATENT DOCUMENTS

2004/0265512 A1* 12/2004 Aengenheyster ........................... B29C 45/14811
428/31
2015/0283786 A1* 10/2015 Massault .................... B60J 1/02
428/161

FOREIGN PATENT DOCUMENTS

CN       104781061 A      7/2015
DE   10 2008 006 553 A1   8/2009
(Continued)

OTHER PUBLICATIONS

Communication dated Jan. 24, 2019 from the State Intellectual Property Office of the P.R.C. in application No. 201710439449.1.
(Continued)

*Primary Examiner* — Phuong T Nguyen
(74) *Attorney, Agent, or Firm* — Sughrue Mion, PLLC

(57) ABSTRACT

A method for manufacturing a plastic window includes a mold preparation step for preparing a first mold, a second mold, and a third mold, a film preparation step for preparing a functional film, a conductive portion, and a bus bar, a placement step for placing the functional film, a first injection step, wherein an intermediate product provided with the cover on the functional film in an integral manner is made, and a second injection step, wherein a product provided with the intermediate product on the second surface in an integral manner is made. The first mold surface has a first forming portion forming the back surface of the cover and a second forming portion forming the second surface of the transparent body. In the placement step, the conductive portion is placed on the second forming portion and the bus bar is placed on the first forming portion.

4 Claims, 12 Drawing Sheets

(51) Int. Cl.
*H05B 1/02* (2006.01)
*B29K 69/00* (2006.01)
*B29L 31/30* (2006.01)

(52) U.S. Cl.
CPC .... *B29K 2069/00* (2013.01); *B29K 2995/002* (2013.01); *B29K 2995/0025* (2013.01); *B29K 2995/0026* (2013.01); *B29L 2031/3052* (2013.01)

(58) Field of Classification Search
CPC ............ B29C 45/1671; B29K 2069/00; B29K 2995/002; B29K 2995/0025; B29K 2995/0026; B29L 2031/3052
USPC ....... 219/201, 203, 206, 493, 497, 492, 494, 219/505, 522, 541, 543, 546, 547, 553; 264/241, 252, 259, 261, 263, 294
See application file for complete search history.

(56) References Cited

FOREIGN PATENT DOCUMENTS

| | | |
|---|---|---|
| JP | 02-227224 A | 9/1990 |
| JP | 6-170883 A | 6/1994 |
| JP | 7-32976 A | 2/1995 |

OTHER PUBLICATIONS

Extended European Search Report dated Dec. 5, 2017 issued by the European Patent Office in counterpart application No. 17174474.1.

* cited by examiner

METHOD FOR MANUFACTURING PLASTIC WINDOW

BACKGROUND OF THE INVENTION

The present invention relates to a method for manufacturing a plastic window and a plastic window.

Japanese Patent Application Publication No. H02-227224 discloses a conventional plastic window. The plastic window includes a transparent body, a film, and a frame. The transparent body is of a plate shape and has on the opposite sides thereof a first surface and a second surface. The transparent body is made of transparent resin. The film includes a transparent base having a sheet shape and a hard coating formed on the surface of the base. The film is provided on the first surface of the transparent body in an integral manner. The frame is made of resin and provided with the transparent body in an integral manner. The frame covers the end surface of the transparent body, the peripheral edge of the first surface of the transparent body including the peripheral edge of the film, and the peripheral edge of the second surface of the transparent body.

The plastic window is manufactured as follows. In the preparation step, the first mold having the first mold surface, the second mold having the second mold surface, and the third mold having the third mold surface are prepared. The first mold surface and the second mold surface cooperate to form a first cavity having a plate shape. The third mold surface and the first mold surface cooperate to form a 25 second cavity having a product shape. In the film preparation step, the film is prepared. In the placement step, the film is placed on the first mold surface.

Next, in the first injection step, the first mold and the second mold are closed and the first molten resin is injected into the first cavity, with the result that an intermediate product is produced. The intermediate product is made including the transparent body made of solidified transparent resin and the film that is provided with the first surface of the transparent body in an integral manner.

Next, in the second injection step, after the first mold and the second mold are opened, the first mold and the third mold are closed and the second molten resin is injected into the second cavity, with the result that a resin frame is formed with the intermediate product in an integral manner. Thus, the plastic window is completed.

In the plastic window, the hard coating of the film protects the first surface of the transparent body. The above-described manufacturing method permits the film to be provided easily on the first surface of the transparent body.

It is conceivable that a conductive part that produces heat or emits light and a bus bar through which electric current flows to the conductive part are added to a plastic window in order to add defogging and ice melting functions, and to improve the decoration of the transparent body.

In this case, the conductive part and the bus bar may be provided directly in the transparent body by printing. However, the resin transparent body may be not only of a plated shape, but also of a curved shape. However, it is difficult to provide a conductive part and a bus bar on a curved transparent body.

It is also conceivable that in the film preparation step of the conventional plastic window manufacturing method, a film having a base on which a conductive portion and a bus bar are formed is prepared. In this case, a conductive portion and a bus bar may be provided easily on the first surface of a transparent body that forms an intermediate product and has a curved shape.

In such a plastic window, however, the exposure of the bus bar on the second surface side of the transparent body degrades the appearance of the plastic window. In order to prevent the exposure of the bus bar, an opaque cover may be provided on the second surface, or alternatively an additional step for coloring the transparent body with opaque color may be performed, which only results in difficulty in the manufacture of the plastic window and hence in increased production cost.

The present invention which has been made in light of the problems mentioned above is directed to providing a method for manufacturing a plastic window which has a good appearance and permits a conductive portion and a bus bar to be easily provided and reduction of the production cost. The present invention is also directed to providing the plastic window.

SUMMARY OF THE INVENTION

In accordance with a first aspect of the present invention, there is provided a method for manufacturing a plastic window. The method includes a mold preparation step for preparing a first mold having a first mold surface, a second mold having a second mold surface and being closed with the first mold to form a first cavity between the first mold surface and the second mold surface, and a third mold having a third mold surface and being closed with the first mold to form a second cavity having a product shape between the first mold surface and the third mold surface, a film preparation step for preparing a functional film having a transparent base of a sheet shape, a conductive portion formed on a back surface of the base, and a bus bar formed on the back surface of the base and electrically connectable to the conductive portion and being thermally deformable, a placement step for placing the functional film on the first mold surface with the back surface of the base in contact with the first mold surface, a first injection step, wherein the first mold and the second mold are closed, wherein a first molten resin is injected into the first cavity to form a cover made of solidified opaque resin of the first molten resin, and wherein an intermediate product provided with the cover on a peripheral edge portion of the functional film in an integral manner is made, and a second injection step, wherein the first mold and the second mold are opened, wherein the first mold and the third mold are closed, wherein a second molten resin is injected into the second cavity to form a transparent body made of solidified transparent resin of the second molten resin and having a first surface and a second surface located on an opposite side from the first surface, and wherein a product provided with the intermediate product on a peripheral edge portion of the second surface in an integral manner is made. The first mold surface has a first forming portion forming the back surface of the cover and a second forming portion forming the second surface of the transparent body. In the placement step, the conductive portion is placed on the second forming portion and the bus bar is placed on the first forming portion.

In accordance with a second aspect of the present invention, there is provided a method for manufacturing a plastic window. The method includes a mold preparation step for preparing a first mold having a first mold surface, a second mold having a second mold surface and being closed with the first mold to form a first cavity between the first mold surface and the second mold surface, and a third mold having a third mold surface and being closed with the first mold to form a second cavity having a product shape between the first mold surface and the third mold surface, a film preparation step for preparing a functional film having a transparent base of a sheet shape, a conductive portion formed on a back surface of the base, and a bus bar forming portion formed on the back surface of the base for forming a bus bar electrically connectable to the conductive portion and being thermally deformable, a placement step for placing the functional film on the first mold surface with the back surface of the base in contact with the first mold surface, a first injection step, wherein the first mold and the second mold are closed, wherein a first molten resin is injected into the first cavity to form a cover made of solidified opaque resin of the first molten resin, and wherein a first intermediate product provided with the cover on a peripheral edge portion of the functional film in an integral manner is made, a second injection step, wherein the first mold and the second mold are opened, wherein the first mold and the third mold are closed, wherein a second molten resin is injected into the second cavity to form a transparent body made of solidified transparent resin of the second molten resin and having a second surface located on an opposite side from the first surface, and wherein a second intermediate product provided with the first intermediate product on a peripheral edge portion of the second surface in an integral manner is made, and a bus bar forming step for forming the bus bar on the bus barforming portion to produce a product. The first mold surface has a first forming portion forming the back surface of the cover and a second forming portion forming the second surface of the transparent body. In the placement step, the conductive portion is placed on the second forming portion and the bus bar forming portion is placed on the first forming portion.

In accordance with a third aspect of the present invention, there is provided a plastic window including a transparent body having a plate shape and including a first surface and a second surface located on an opposite side from the first surface and being made of transparent resin, a cover provided on a peripheral edge portion of the second surface of the transparent body in an integral manner and being made of opaque resin, and a functional film provided on the second surface of the transparent body and a back surface of the cover in an integral manner. The functional film includes a transparent base having a sheet shape and being provided on the second surface of the transparent body and the back surface of the cover in an integral manner, a conductive portion formed on the base and located on the second surface, and a bus bar formed on the base and located on the back surface of the cover. The bus bar is electrically connectable to the conductive portion.

In accordance with a fourth aspect of the present invention, there is provided a method for manufacturing a plastic window. The method includes a mold preparation step for preparing a first mold having a first mold surface, a second mold having a second mold surface and being closed with the first mold to form a first cavity of a plate shape between the first mold surface and the second mold surface, and a third mold having a third mold surface and being closed with the second mold to form a second cavity having a product shape between the second mold surface and the third mold surface, a preparation step for preparing a functional film having a transparent base of a sheet shape, a conductive portion formed on a back surface of the base, a bus bar formed on the same side as the conductive portion with respect to the base and electrically connectable to the conductive portion, and a colored portion formed on a front surface of the base or the back surface of the base in an overlapping manner with the bus bar and made of opaque color to prevent the bus bar from being exposed to the front surface of the base and being thermally deformable, a placement step for placing the functional film on the first mold surface with the back surface of the base in contact with the first mold surface, a first injection step, wherein the first mold and the second mold are closed, wherein a first molten resin is injected into the first cavity to form a transparent body made of solidified transparent resin of the first molten resin and having a first surface and a second surface located on an opposite side from the first surface, and wherein an intermediate product provided with the transparent body on the front surface of the base of the functional film in an integral manner is made, and a second injection step, wherein the first mold and the second mold are opened, wherein the second mold and the third mold are closed, wherein a second molten resin is injected into the second cavity to form a cover made of solidified opaque resin of the second molten resin with the conductive portion and the bus bar being exposed outside the cover, and wherein a product provided with the cover on a peripheral edge portion of the second surface in an integral manner is made.

In accordance with a fifth aspect of the present invention, there is provided a method for manufacturing a plastic window. The method includes a mold preparation step for preparing a first mold having a first mold surface, a second mold having a second mold surface and being closed with the first mold to form a first cavity of a plate shape between the first mold surface and the second mold surface, and a third mold having a third mold surface and being closed with the second mold to form a second cavity having a product shape between the second mold surface and the third mold surface, a preparation step for preparing a functional film having a transparent base having a sheet shape, a conductive portion formed on a back surface of the base, a bus bar forming portion formed on the back surface of the base for forming a bus bar electrically connectable to the conductive portion, and a colored portion formed on a front surface of the base or the back surface of the base in an overlapping manner with the bus bar forming portion and made of opaque color to prevent the bus bar from being exposed to the front surface of the base and being thermally deformable, a placement step for placing the functional film on the first mold surface with the back surface of the base in contact with the first mold surface, a first injection step, wherein the first mold and the second mold are closed, wherein a first molten resin is injected into the first cavity to form a transparent body made of solidified transparent resin of the first molten resin and having a first surface and a second surface located on an opposite side from the first surface, and wherein a first intermediate product provided with the transparent body on the front surface of the base of the functional film in an integral manner is made, a second injection step, wherein the first mold and the second mold are opened, wherein the second mold and the third mold are closed, wherein a second molten resin is injected into the second cavity to form a cover made of solidified opaque resin of the second molten resin with the conductive portion and the bus bar being exposed outside the cover, and wherein a second intermediate product provided with the cover on a peripheral edge portion of the second surface in an integral manner is made, and a bus bar forming step for forming the bus bar on the bus bar forming portion to produce a product.

In accordance with a sixth aspect of the present invention, there is provided a plastic window including a transparent body having a plate shape and including a first surface and a second surface located on an opposite side from the first surface and made of transparent resin, a functional film provided on the second surface of the transparent body in an integral manner, and a cover provided on a peripheral edge portion of the second surface of the transparent body and a peripheral edge portion of a back surface of the functional film in an integral manner. The cover is made of opaque resin. The functional film includes a transparent base having a sheet shape and being provided on the second surface of the transparent body in an integral manner, a conductive portion formed on the base and located on the second surface, a bus bar formed on the base and electrically connectable to the conductive portion, and a colored portion formed on a front surface of the base or a back surface of the base to prevent the bus bar from being exposed to the front surface of the base. The conductive portion and the bus bar are exposed outside the cover.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

The following will describe a plastic window according to a first embodiment through a fourth embodiment of the present invention with reference to the accompanying drawings.

First Embodiment

Figure 1:
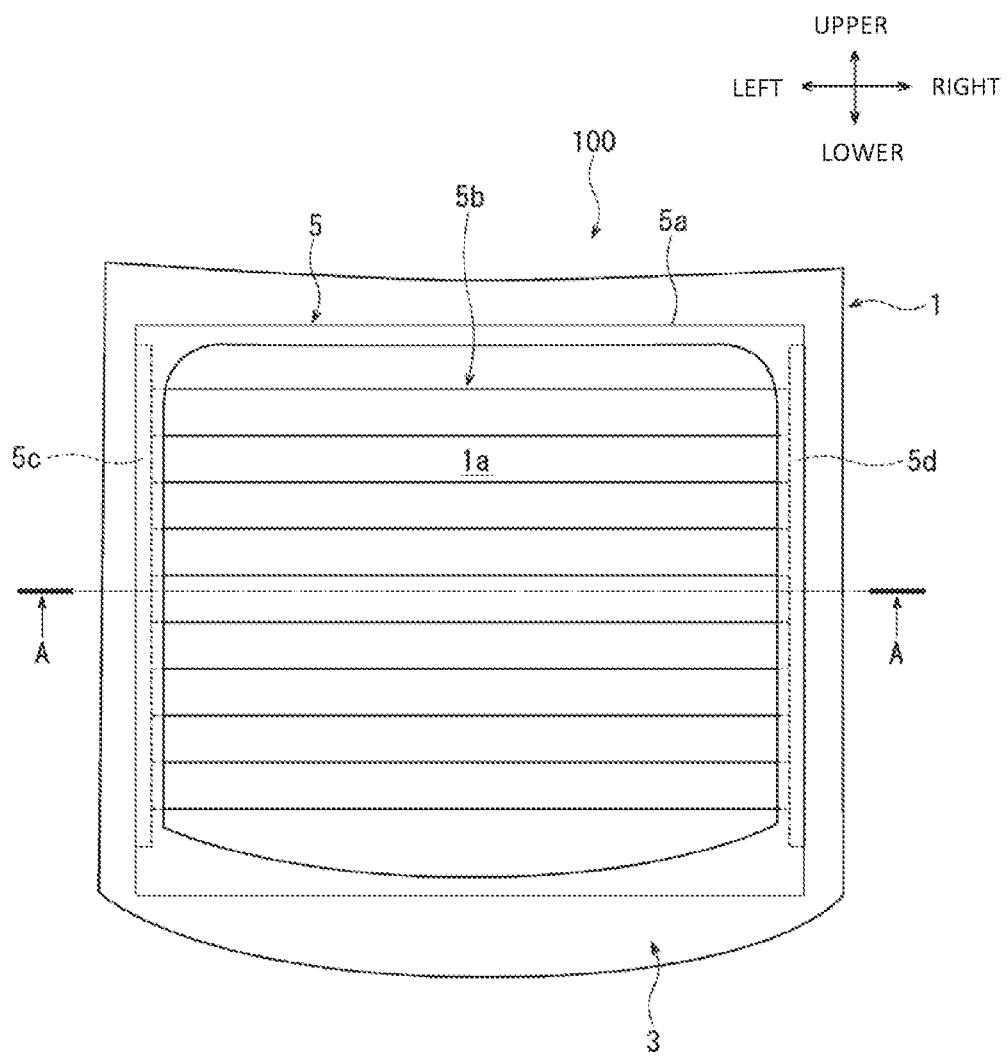
FIG. 1 is a front view of a plastic window manufactured by a method according to a first embodiment of the present invention, as viewed from a first surface side of a transparent body of the plastic window.
Figure 2:
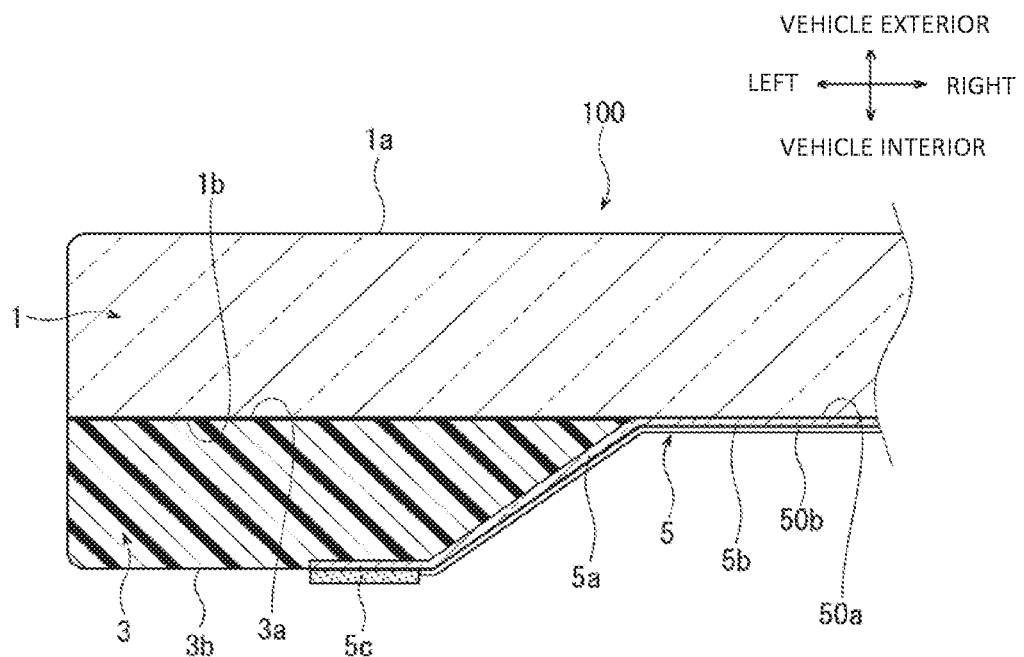
FIG. 2 is an enlarged fragmentary sectional view taken along the line A-A of FIG. 1.
Figure 12:
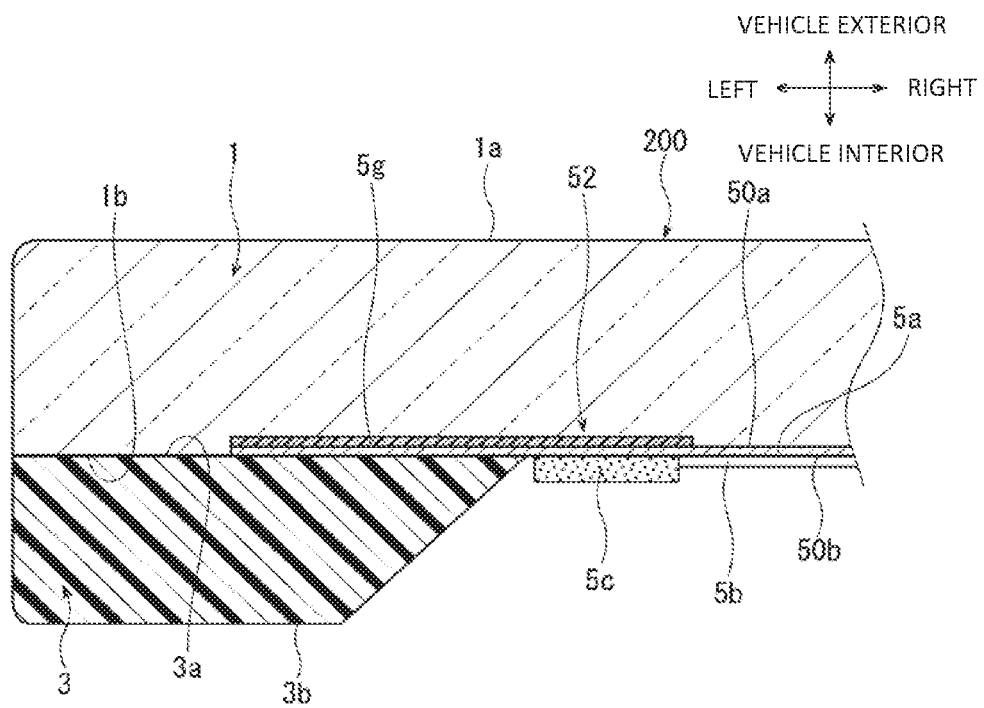
FIG. 12 is an enlarged fragmentary sectional view taken along the line B-B of FIG. 11.
Figure 22:
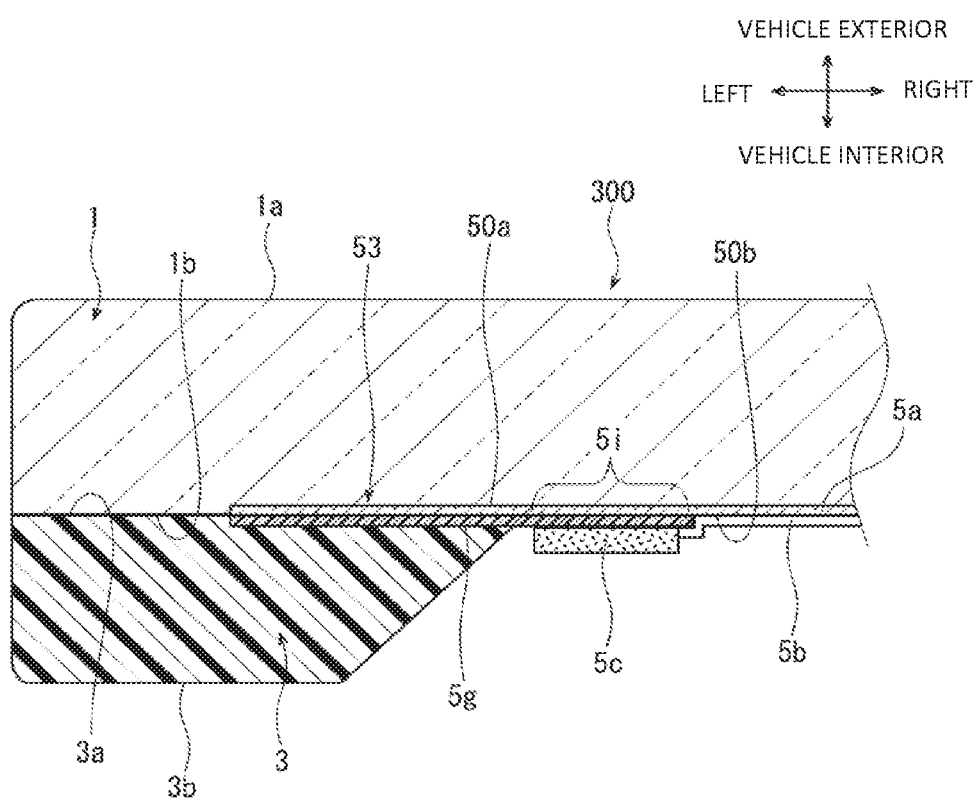
FIG. 22 is an enlarged fragmentary sectional view of the second intermediate product of FIG. 21.

Referring to FIG. 1, a plastic window 100 according to the first embodiment includes a transparent body 1, a cover 3, and a functional film 5. The plastic window 100 is of a type that is mounted to a vehicle not shown. In the present embodiment, arrows shown in FIG. 1 denote the right, left, front, and rear directions of the plastic window 100, respectively. Left and right directions are perpendicular to front and rear directions. The same is true for the drawings having a similar directional notation. In FIGS. 2, 12, and 22, arrows with interior and exterior indicate the inside and outside of the vehicle, respectively, when the plastic window 100 or plastic windows 200, 300 which will be described later is mounted to a vehicle. These directions will be used for the sake of the description.

As shown in FIG. 2, the transparent body 1 is substantially of a rectangular flat plate shape and has on the opposite sides thereof a first surface 1a and a second surface 1b. The first surface 1a of the plastic window 100 as mounted to a vehicle faces the vehicle exterior and the second surface 1b faces the vehicle interior.

The transparent body 1 is made of transparent resin having transparency permitting light transmission from the first surface 1a to the second surface 1b, such as polycarbonate-based resin. The transparent body 1 may be made of transparent resin other than polycarbonate-based resin. The thickness of the transparent body 1 may be determined according to design requirement.

The cover 3 is of a plate shape and has on the opposite sides thereof a front surface 3$a$ and a back surface 3$b$. The cover 3 is of a frame shape as shown in FIG. 1. The outer peripheral shape of the cover 3 is substantially the same as that of the transparent body 1. As shown in FIG. 2, the cover 3 is fixed to the peripheral edge portion of the second surface 1$b$ of the transparent body 1 with the front surface 3$a$ of the cover 3 in contact with the second surface 1$b$ of the transparent body 1. When the plastic window 100 is mounted to the vehicle, the back surface 3$b$ of the cover 3 faces the vehicle interior. The cover 3 may be of a shape other than a frame shape.

The cover 3 is made of opaque resin such as black-colored polycarbonate-based resin. In the plastic window 100, the interior of the vehicle is invisible from the exterior side of the vehicle through the cover 3. That is, the back surface 3$b$ of the cover 3 is invisible from the side of the first surface 1$a$ of the transparent body 1. The cover 3 may be colored opaque color other than black. The cover 3 may be made of any other resin than polycarbonate-based resin. The thickness of the cover 3 may be determined according to design requirement.

Figure 3:
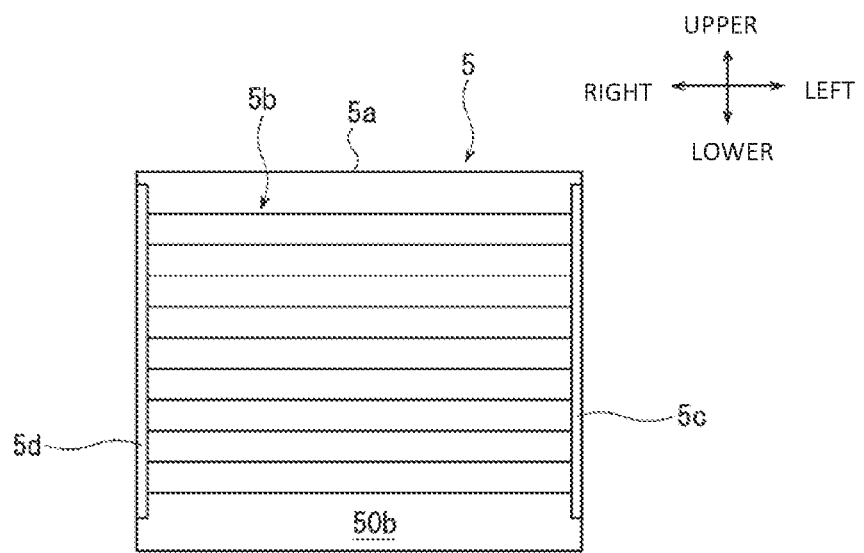
FIG. 3 is a rear view of a functional film that is prepared in a film preparation step of the method for manufacturing the plastic window of FIG. 1.

As shown in FIG. 3, the functional film 5 includes a base 5$a$, a conductive portion 5$b$, and bus bars 5$c$, 5$d$. The base 5$a$ is of a rectangular sheet shape and has on opposite sides thereof a front surface 50$a$ and a back surface 50$b$ as shown in FIG. 2. The base 5$a$ is transparent, permitting light transmission between the front surface 50$a$ and the back surface 50$b$. As shown in FIG. 1, the base 5$a$ is disposed within the transparent body 1 and the cover 3.

As shown in FIG. 3, the conductive portion 5$b$ and the bus bars 5$c$, 5$d$ are made of a conductive material and formed or screen-printed on the back surface 50$b$ of the base 5$a$. Specifically, the conductive portion 5$b$ and the bus bars 5$c$, 5$d$ are formed such that a conductive material is printed on the back surface 50$b$ of the base 5$a$ by screen printing. It is noted that the conductive portion 5$b$ and the bus bars 5$c$, 5$d$ may be formed on the back surface 50$b$ of the base 5$a$ by photolithography, etching or vapor deposition.

The conductive portion 5$b$ is formed by a plurality of conductive wires extending linearly in the right and left direction of the base 5$a$. The bus bars 5$c$, 5$d$ extend in the upper and lower direction of the base 5$a$. The bus bar 5$c$ is located on the left side of the conductive portion 5$b$ and connected to the conductive portion 5$b$. The bus bar 5$d$ is located on the right side of the conductive portion 5$b$ and connected to the conductive portion 5$b$. The bus bars 5$c$, 5$d$ are electrically connectable to the conductive portion 5$b$.

As shown in FIG. 2, the functional film 5 of the plastic window 100 is connected integrally to the second surface 1$b$ of the transparent body 1 and the back surface 3$b$ of the cover 3. In the functional film 5, the front surface 50$a$ of the base 5$a$ is attached to the second surface 1$b$ of the transparent body 1 and the back surface 3$b$ of the cover 3. As shown in FIG. 1, the conductive portion 5$b$ is disposed on the second surface 1$b$ of the transparent body 1 and the bus bars 5$c$, 5$d$ are disposed on the back surface 3$b$ of the cover 3. In the drawings such as FIG. 2, the thicknesses of the base 5$a$, the conductive portion 5$b$, and the bus bar 5$c$ are shown exaggerated for the ease of explanation.

Figure 4:
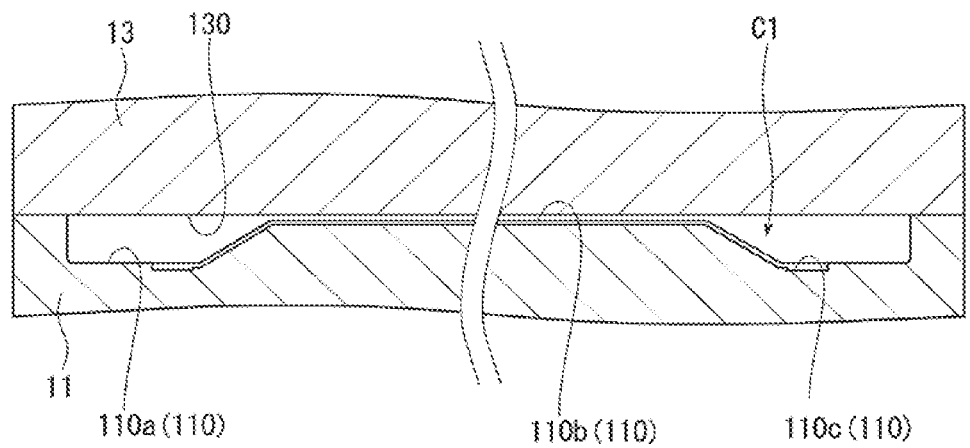
FIG. 4 is a fragmentary sectional view of a first mold and a second mold that are used in the method for manufacturing the plastic window of FIG. 1.
Figure 7:
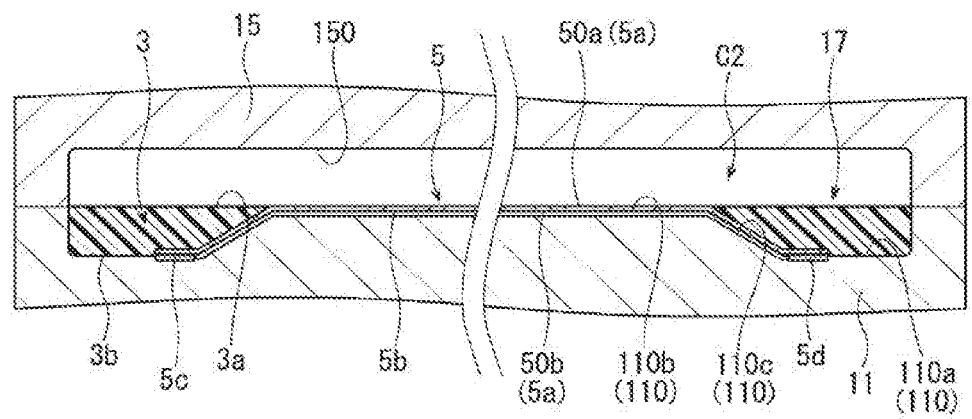
FIG. 7 is a fragmentary sectional view showing a second cavity formed in a second injection step of the method for manufacturing the plastic window of FIG. 1.

The following will describe a method for manufacturing the plastic window 100 (hereinafter referred to merely as manufacturing method). The manufacturing method includes a mold preparation step, according to which a first mold 11 and a second mold 13 shown in FIG. 4 and a third mold 15 shown in FIG. 7 are prepared. As shown in FIG. 4, the first mold 11 has a recessed first mold surface 110. The first mold surface 110 includes a first forming portion 110$a$, a second forming portion 110$b$, and a groove 110$c$. The first forming portion 110$a$ is used to form the back surface 3$b$ of the cover 3 in a first injection step which will be described later. The second forming portion 110$b$ is used to form the second surface 1$b$ of the transparent body 1 in a second injection step which will be described later. The groove 110$c$ is formed in the first forming portion 110$a$ and the second forming portion 110$b$ to connect the conductive portion 5$b$ and the bus bars 5$c$, 5$d$. The forming of the groove 110$c$ may be omitted.

The second mold 13 has a second mold surface 130. The second mold surface 130 is flat and is used to form the front surface 3$a$ of the cover 3 in the first injection step. As shown in FIG. 7, the third mold 15 has a recessed third mold surface 150. The third mold surface 150 is used to form the first surface 1$a$ of the transparent body 1 in the second injection step.

The manufacturing method includes a film preparation step, according to which the functional film 5 shown in FIG. 3 is prepared. In the functional film 5 prepared in the film preparation step, the conductive portion 5$b$ and the bus bars 5$c$, 5$d$ are already formed on the back surface 50$b$ of the base 5$a$ of the functional film 5.

Figure 5:
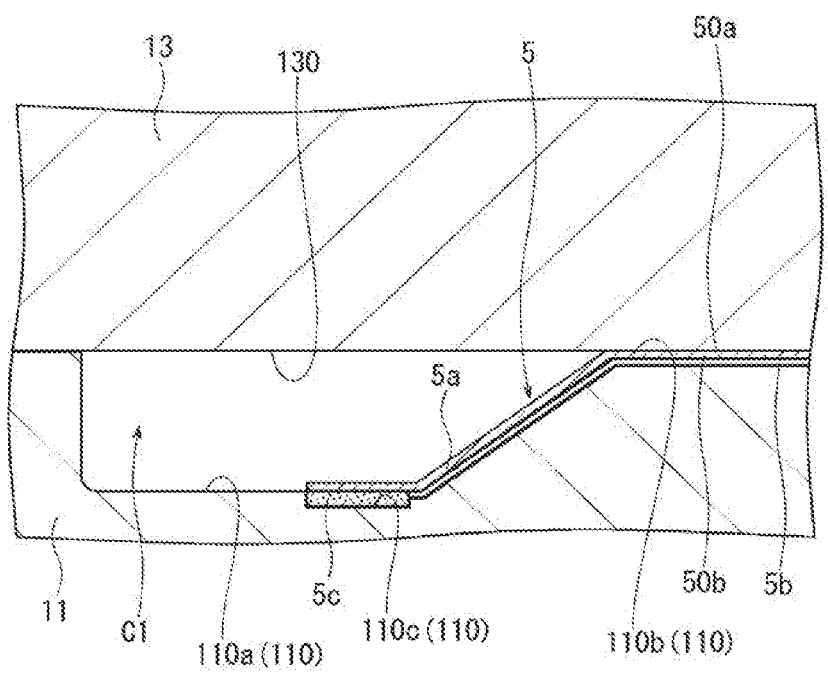
FIG. 5 is an enlarged fragmentary sectional view showing a placement step of the method for manufacturing the plastic window of FIG. 1.

The manufacturing method further includes a placement step, according to which the functional film 5 is placed in the first mold surface 110, as shown in FIG. 5. In the placement step, the base 5$a$ is set in contact at the back surface 50$b$ thereof with the first mold surface 110 with the conductive portion 5$b$ disposed in the second forming portion 110$b$ and with the bus bars 5$c$, 5$d$ disposed in the first forming portion 110$a$, respectively. In this case, the back surface 50$b$ of the base 5$a$ may be set in tight contact with the first mold surface 110 by fitting the conductive portion 5$b$ and the bus bars 5$c$, 5$d$ in the groove 110$c$.

After the placement step, the first injection step is performed. In the first injection step, with the functional film 5 placed on the first mold surface 110, the first mold 11 and the second mold 13 are closed and clamped together as shown in FIG. 5. Then, a first cavity C1 is formed between the first mold 11 and the second mold 13 by the first mold surface 110 and the second mold surface 130. The first cavity C1 is of a frame shape.

Figure 6:
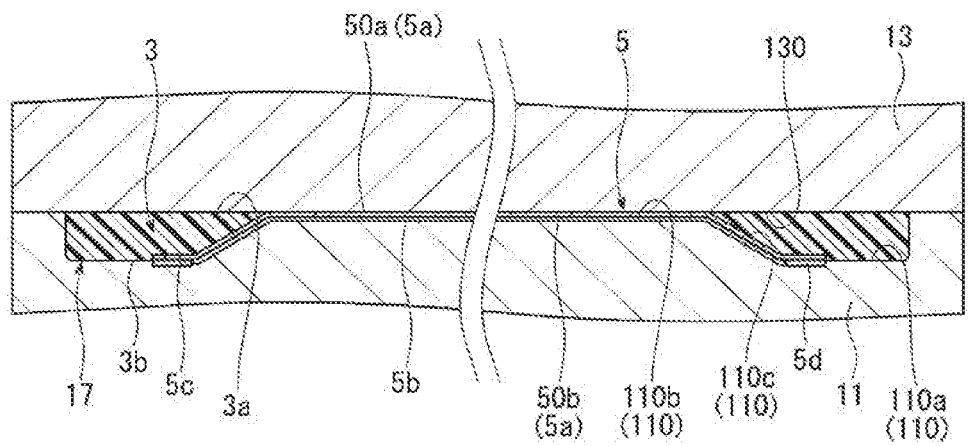
FIG. 6 is a fragmentary sectional view showing a first injection step of the method for manufacturing the plastic window of FIG. 1.

A first molten resin is injected into the first cavity C1 by an injection machine not shown. The first molten resin includes the above-mentioned black-colored opaque polycarbonate-based resin for the cover 3. The injected first molten resin is solidified, with the result that the cover 3 is formed as shown in FIG. 6. Then, the functional film 5 is thermally deformed along the shape of the first mold surface 110 attached tightly to and integrated with the cover 3. Thus, an intermediate product 17 including the cover 3 and the functional film 5 is made. In the placement step, the functional film 5 was placed on the first mold surface 110 as described above. In the intermediate product 17, therefore, with the bus bars 5$c$, 5$d$ placed on the back surface 3$b$ of the cover 3, the cover 3 is provided in an integral manner with the peripheral edge portion of the front surface 50$a$ of the base 5$a$ of the functional film 5.

Next, the second injection step is performed. In the second injection step, the first mold 11 and the second mold 13 are firstly opened and then the first mold 11 and the third mold 15 are closed as shown in FIG. 7. As a result, a second cavity C2 is formed between the first mold 11 and the third mold 15 by the first mold surface 110 and the third mold surface 150. The second cavity C2 has substantially the same shape as the plastic window 100 as a final product. It is noted that when the first mold 11 and the second mold 13 are opened, the intermediate product 17 remains in the second cavity C2 without being removed therefrom.

Figure 8:
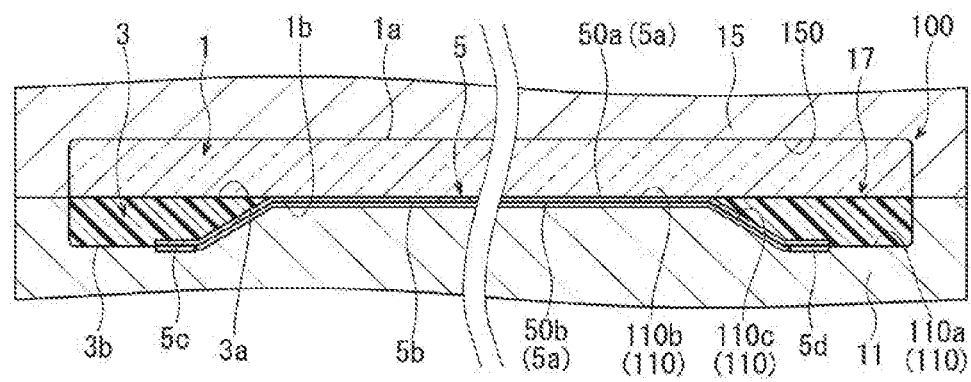
FIG. 8 is a fragmentary sectional view showing the second injection step in which a transparent body is formed in an integral manner with the intermediate product of FIG. 6 of the method for manufacturing the plastic window of FIG. 1.

The injection machine not shown in the drawing injects a second molten resin into the second cavity C2. The second molten resin includes the above-mentioned polycarbonate-based transparent resin for the transparent body 1. The injected second molten resin is solidified, with the result that the transparent body 1 having the first surface 1a and the second surface 1b is formed as shown in FIG. 8. Then, the functional film 5 is thermally deformed in tight contact with the second surface 1b. Thus, the intermediate product 17 is formed on the second surface 1b of the transparent body 1 in an integral manner. Specifically, with the front surface 3a of the cover 3 in contact with the peripheral edge portion of the second surface 1b, the front surface 3a of the cover 3 is integrated with the peripheral edge portion of the second surface 1b. With the front surface 50a of the base 5a in contact the second surface 1b, the functional film 5 is integrated with the second surface 1b more inside than the cover 3. Therefore, the conductive portion 5b is disposed more inside than the cover 3 in the second surface 1b. Thus, the plastic window 100 shown in FIG. 1 is completed.

In the second injection step, a product in which an intermediate product is provided with the peripheral edge portion of the second surface of the transparent body in an integral manner, or a plastic window in which a cover and a conductive portion are provided therewith in an integral manner in the peripheral edge portion of the second surface of the transparent body is made.

The plastic window 100 is mounted to a window frame of a vehicle. The mounting between the plastic window 100 and the vehicle which is concealed by the cover 3 will not be exposed to the exterior of the vehicle. With the plastic window 100 mounted properly to the vehicle, the bus bars 5c, 5d are electrically connectable to a controller not shown in the drawing. When the conductive portion 5b is energized by electric current supplied through the bus bars 5c, 5d, the conductive portion 5b is heated, so that defogging or ice melting of the transparent body 1 is performed. It is noted that the cover 3 and the bus bars 5c, 5d are covered with a panel not shown in the drawing and is invisible from the exterior of the vehicle.

In the manufacturing method according to the present embodiment, since the functional film 5 prepared in the preparation step includes the base 5a, the conductive portion 5b, and the bus bars 5c, 5d (FIG. 3), the conductive portion 5b and the bus bars 5c, 5d may be provided easily as compared with a structure in which the conductive portion 5b and the bus bars 5c, 5d are directly formed on the second surface 1b of the transparent body 1. In the method of manufacturing a plastic window 100 in which the conductive portion 5b is disposed on the second surface 1b of the transparent body 1. The bus bars 5c, 5d are disposed on the back surface 3b of the cover 3. The transparent body 1 is made of transparent resin. The cover 3 is made of opaque resin. Though the bus bars 5c, 5d are exposed through the back surface 50b of the cover 3, the bus bars 5c, 5d are concealed by the cover 3 as shown in FIG. 1 and will not be exposed through the first surface 1a of the transparent body 1, or to the exterior of the vehicle. Thus, the manufacturing method of the present embodiment may dispense with a step for providing an additional cover or a step for providing opaque color to the first surface 1a for preventing the bus bars 5c, 5d from being exposed through the first surface 1a of the transparent body 1. Since the functional film 5 is transparent, the base 5a is almost invisible from the exterior of a vehicle.

As will be apparent from the foregoing, the method for manufacturing the plastic window 100 according to the first embodiment permits the conductive portion 5b and the bus bars 5c, 5d to be easily provided, the plastic window 100 to have a good appearance, and the production cost to be reduced.

Second Embodiment

Figure 9:
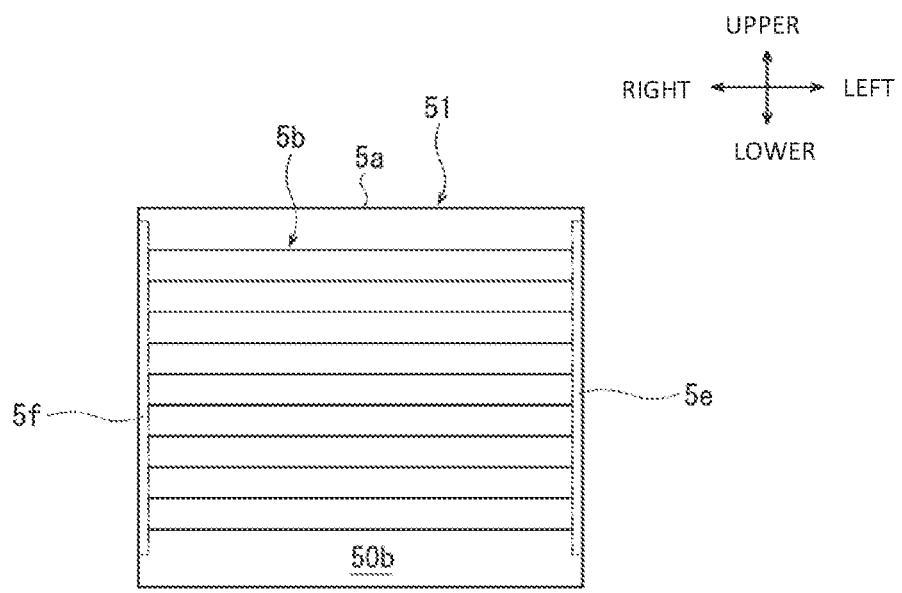
FIG. 9 is a rear view of a functional film for a plastic window that is prepared in a film preparation step of a plastic window manufacturing method according to a second embodiment of the present invention.
Figure 10:
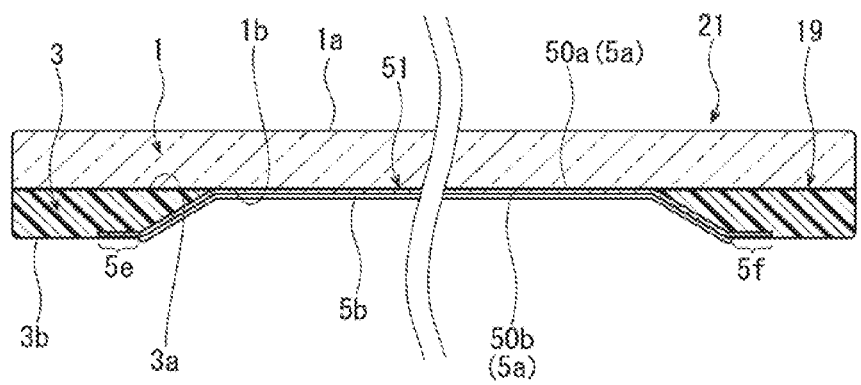
FIG. 10 is a fragmentary sectional view of a second intermediate product of the plastic window which is to be manufactured according to the second embodiment.

The following will describe a method for manufacturing a plastic window according to a second embodiment of the present invention with reference to FIGS. 9 and 10. The second embodiment differs from the first embodiment in that a functional film 51 shown in FIG. 9 is prepared instead of the functional film 5 used in the method according to the first embodiment. As with the functional film 5, the functional film 51 includes the base 5a and the conductive portion 5b formed on the back surface 50b of the base 5a. In the functional film 51, bus bar forming portions 5e, 5f are provided on the back surface 50b of the base 5a as shown by the imaginary line in FIG. 9. The bus bar forming portion 5e is located on the left side of the conductive portion 5b. The bus bar forming portion 5f is located on the right side of the conductive portion 5b. That is, in the film preparation step of the manufacturing method, the bus bars such as 5c and 5d are not formed on the functional film 51.

In the placement step of the manufacturing method, the functional film 51 is placed on the first mold surface 110. Then, the conductive portion 5b is placed on the second forming portion 110b with the bus bar forming portions 5e, 5f in facing relation to the first forming portion 110a and the back surface 50b of the base 5a is brought into contact with the first mold surface 110.

As with the manufacturing method according to the first embodiment, in the first injection step, a first intermediate product 19 shown in FIG. 10 is produced. The first intermediate product 19 is formed by the cover 3 and the functional film 51. As with the functional film 5, the functional film 51 is thermally deformed and fixed to the cover 3. In the first intermediate product 19, the cover 3 is formed in the peripheral edge portion of the front surface 50a of the base 5a with the bus bar forming portions 5e, 5f located on the back surface of the cover 3.

As with the manufacturing method according to the first embodiment, in the second injection step, the second molten resin is injected into the second cavity C2 and a second intermediate product 21 is produced. The second intermediate product 21 is formed by the transparent body 1 having the first surface 1a and the second surface 1b, and the first intermediate product 19. The functional film 51 is thermally deformed in tight contact with the second surface 1b. In the second intermediate product 21, the transparent body 1 is integrated with the cover 3 with the front surface 3a of the cover 3 in contact with the peripheral edge portion of the cover 3. At a position more inside than the cover 3 on the second surface 1b, with the front surface 50a of the base 5a in contact with the functional film 50, the functional film 51 is integrated with the cover 3. Thus, in the second intermediate product 21, the conductive portion 5b is disposed more inward of the cover 3 on the second surface 1b.

The plastic window produced by the manufacturing method according to the second embodiment has the same function as the plastic window manufactured by the method of the first embodiment.

Then, the second intermediate product 21 is removed from the second cavity C2 and subsequently the bus bar forming step is performed. In the bus bar forming step, conductive material is applied on the bus bar forming portions 5e, 5f. The bus bar 5c is formed on the bus bar forming portion 5e and the bus bar 5d is formed on the bus bar forming portion 5f respectively. Thus, the plastic window 100 shown in FIG. 1 is completed.

The manufacturing method according to the second embodiment permits the conductive portion and the bus bar to be easily provided, the plastic window to have a good appearance, and the production cost to be reduced.

In a first plastic window according to the present invention, or the plastic window 100, the functional film is fixed to the second surface of the transparent body and the back surface of the cover. The conductive portion is disposed on the second surface of the transparent body and the bus bars are disposed on the back surface of the cover. The transparent body is made of transparent resin and the cover is made of opaque resin. Thus, the first plastic window has the same function as the plastic window manufactured by the first and second manufacturing methods.

In the first plastic window according to the present invention, the conductive portion and the bus bar can be easily formed and the first plastic window has a good appearance and the production cost can be reduced.

Third Embodiment

Figure 11:
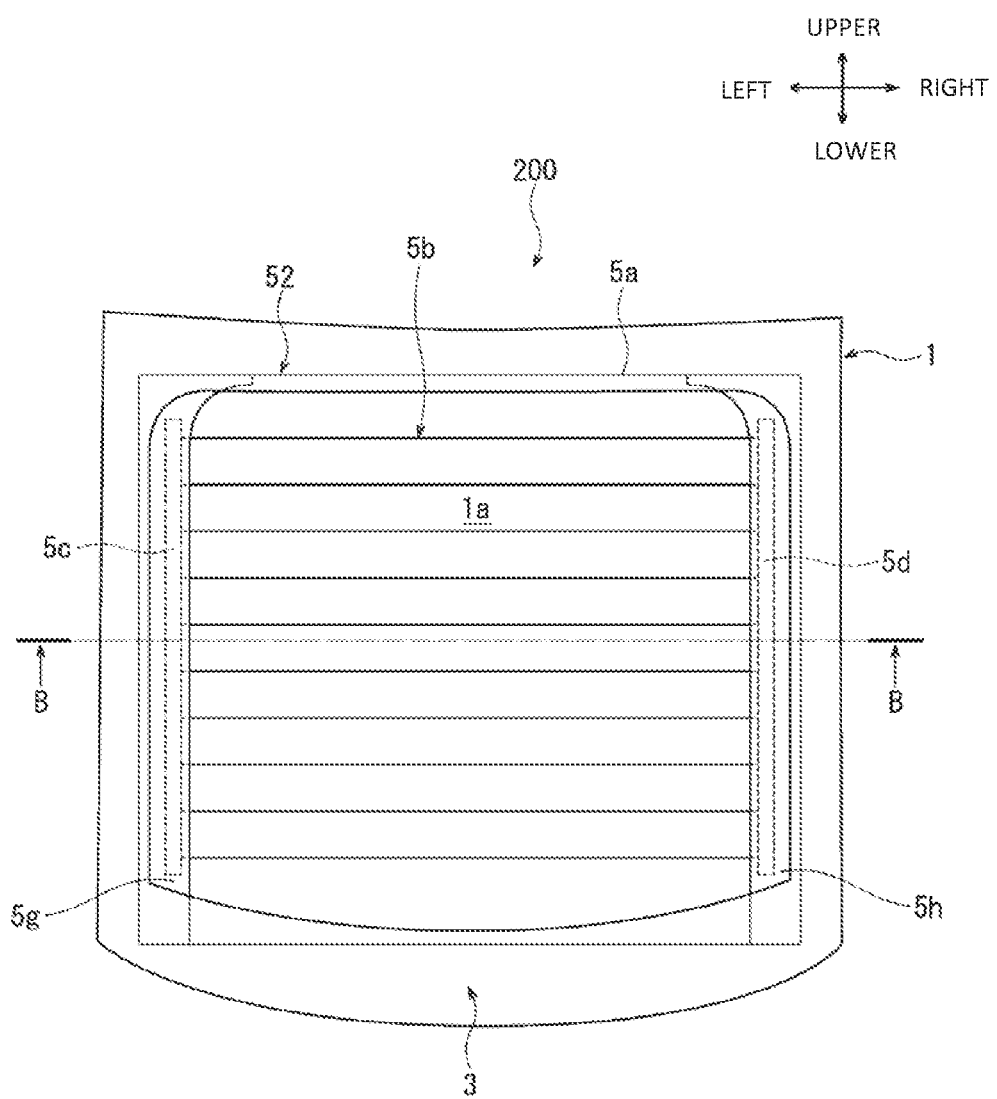
FIG. 11 is a front view of a plastic window manufactured by a method according to a third embodiment of the present invention.

Referring to FIGS. 11 and 12, there is shown a plastic window 200 that is adapted to be mounted on a vehicle not shown and includes the transparent body 1 and the cover 3.

Figure 13:
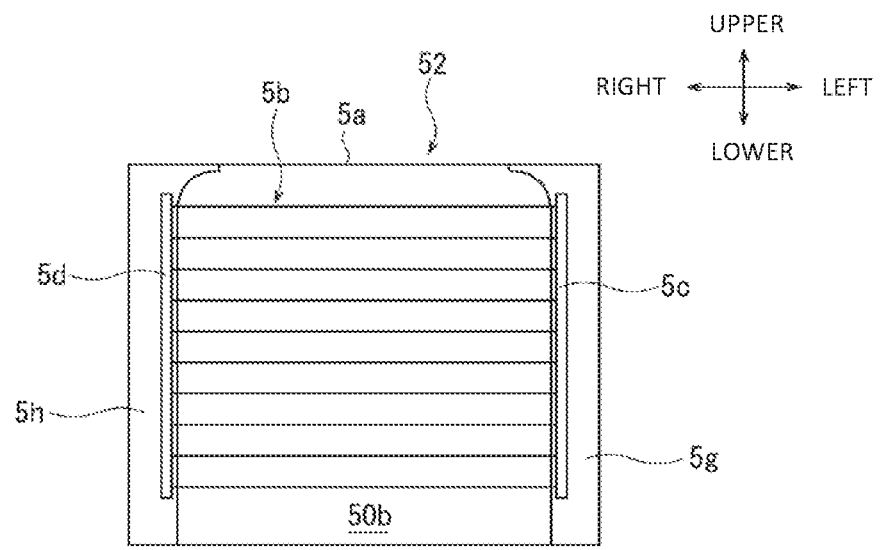
FIG. 13 is a rear view of a functional film for a plastic window of FIG. 11 that is prepared in a film preparation step of the plastic window manufacturing method according to the third embodiment.
Figure 14:
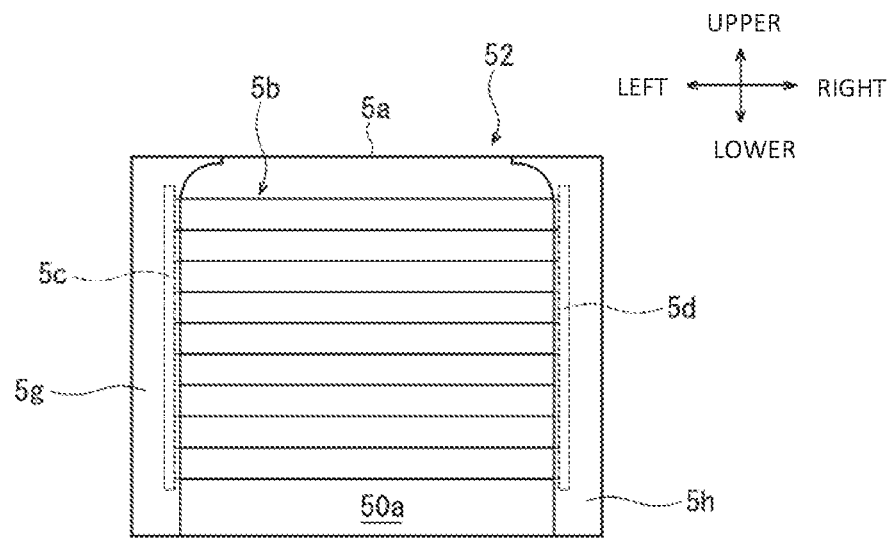
FIG. 14 is a front view of the functional film of FIG. 13.

There is shown in FIGS. 13 and 14 a functional film 52 for the plastic window 200. As with the functional film 5 shown in FIG. 3, the functional film 52 includes the base 5a, the conductive portion 5b, and the bus bars 5c, 5d. The functional film 52 further includes colored portions 5g, 5h. As shown in FIG. 13, the conductive portion 5b and the bus bars 5c, 5d are formed on the back surface 50b of the base 5a. As shown in FIG. 14, the colored portions 5g, 5h are formed on the front surface 50a of the base 5a. The colored portions 5g, 5h are formed by providing black-colored opaque portions on the back surface 50b of the base 5a. The colored portion 5g is located at a position adjacent to the left end of the front surface 50a in an overlapping manner with the bus bar 5c and extends in the vertical direction of the base 5a. The colored portion 5h is located at a position adjacent to the right end of the front surface 50a in an overlapping manner with the bus bar 5d and extends in the vertical direction of the base 5a. The colored portions 5g, 5h are formed in conformity with the shape of the cover 3 and disposed symmetrically with each other. The colored portions 5g, 5h may be colored opaque other than black. The shape of the colored portions 5g, 5h may be changed according to any design requirement.

Referring to FIG. 12 showing the plastic window 200 in cross section, the functional film 52 is formed with the second surface 1b of the transparent body 1 in an integral manner and between the transparent body 1 and the cover 3. Specifically, the functional film 52 is provided with the front surface 50a of the base 5a facing the second surface 1b of the transparent body 1 and the back surface 50b of the base 5a facing the front surface 3a of the cover 3, respectively. As shown in FIG. 11, in the plastic window 200, the cover 3 is located more outside than the conductive portion 5b and the bus bars 5c, 5d and provided with the peripheral edge portion of the second surface 1b in an integral manner.

Figure 15:
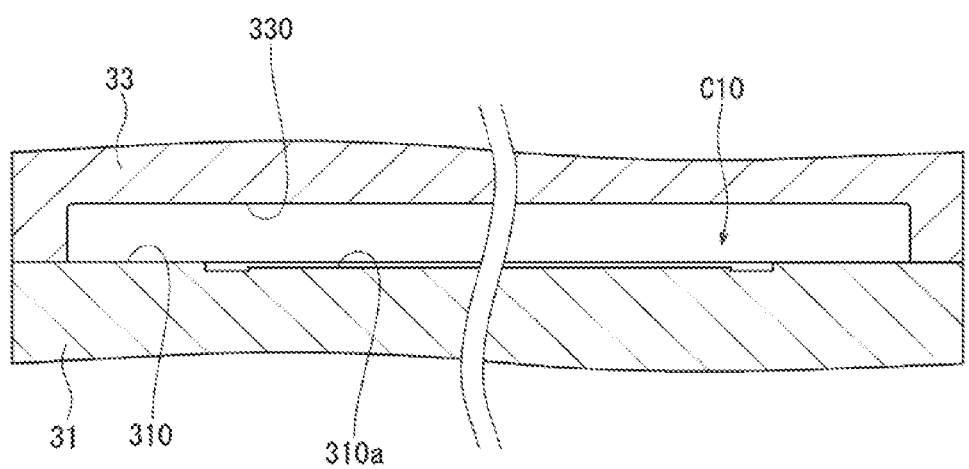
FIG. 15 is a fragmentary sectional view of a first mold and a second mold that are used in the method for manufacturing the plastic window of FIG. 11 according to the third embodiment.
Figure 18:
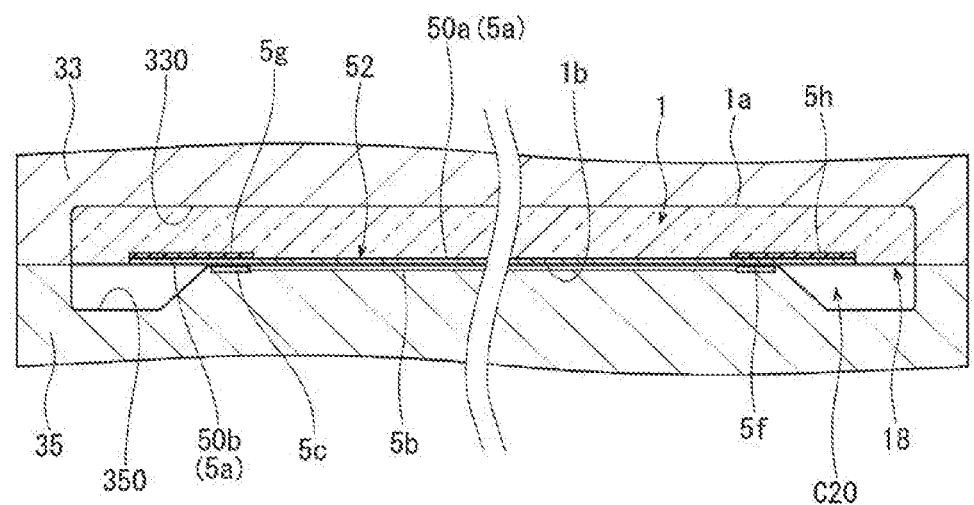
FIG. 18 is a fragmentary sectional view showing a second injection step in which a second mold and a third mold are closed and a second cavity is formed therebetween in the plastic window manufacturing method according to the third embodiment.
Figure 19:
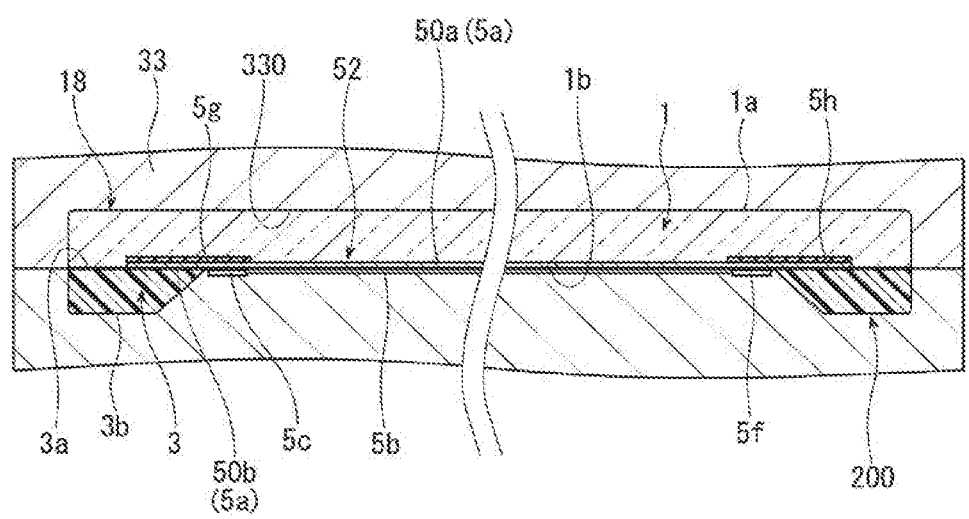
FIG. 19 is a fragmentary sectional view showing the second injection step in which a cover is formed with an intermediate product in an integral manner.

The following will describe a method for manufacturing the plastic window 200 according to the third embodiment. In the mold preparation step of the manufacturing method according to the third embodiment, a first mold 31 and a second mold 33 shown in FIG. 15 and a third mold 35 shown in FIG. 18 are prepared. As shown in FIG. 15, the first mold 31 has a first mold surface 310. In the first injection step which will be described later, the first mold surface 310 forms the second surface 1b of the transparent body 1. The first mold surface 310 has therein a recess 310a that conforms to the conductive portion 5b and the bus bars 5c, 5d. The recess 310a may be dispensed with.

The second mold 33 has a second mold surface 330. In the first injection step, the second mold surface 330 forms the first surface 1a of the transparent body 1. As shown in FIG. 18, the third mold 35 has therein a third mold surface 350 in the form of a recess. The third mold surface 350 forms the back surface 3b of the transparent body 1 in the second injection step.

In the film preparation step, the functional film 52 shown in FIGS. 13 and 14 is prepared. The functional film 52 has already on the front surface 50a of the base 5a thereof the colored portions 5g, 5h and on the back surface 50b of the base 5a thereof the conductive portion 5b and the bus bars 5c, 5d, respectively.

Figure 16:
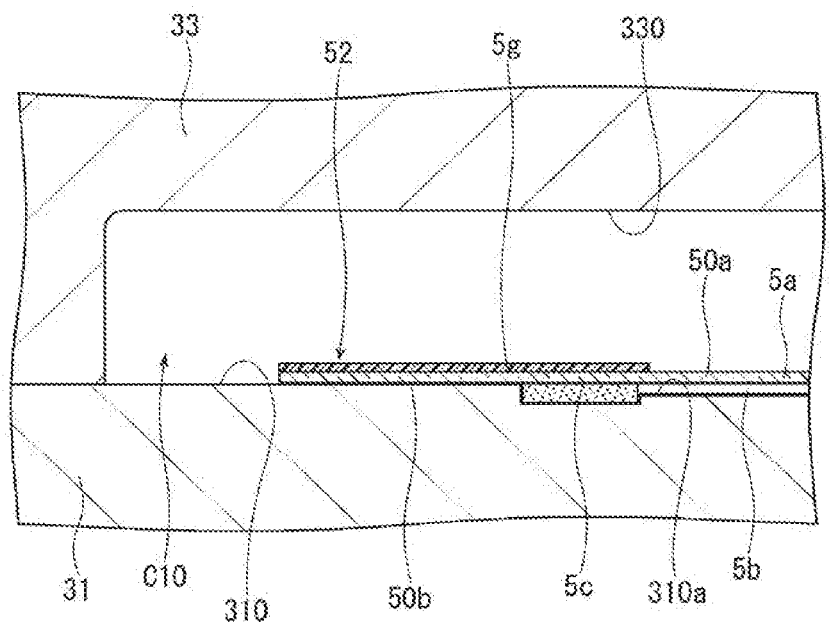
FIG. 16 is an enlarged fragmentary sectional view showing a placement step of the plastic window manufacturing method according to the third embodiment.
Figure 17:
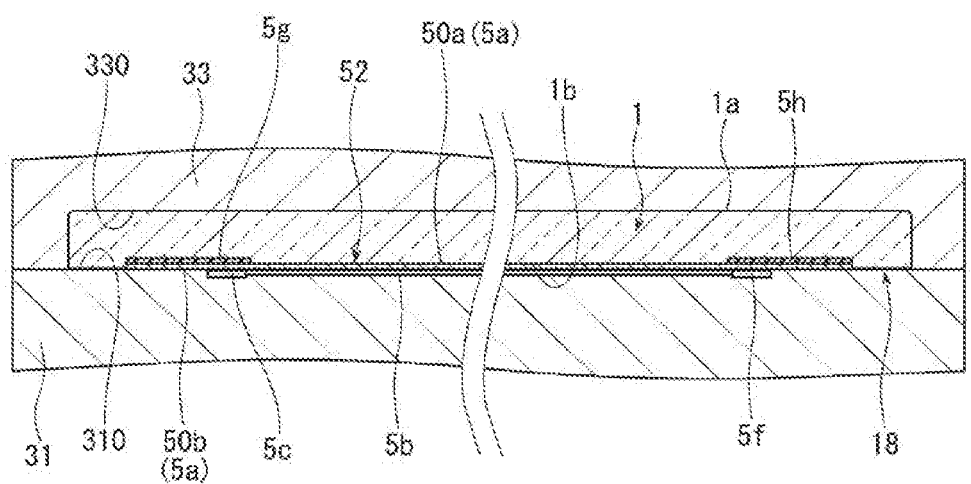
FIG. 17 is a fragmentary sectional view showing a first injection step of the plastic window manufacturing method according to the third embodiment.

In the next placement step, the functional film 52 is placed on the first mold surface 310 as shown in FIG. 16. In this step, the back surface 50b of the base 5a is set in tight contact with the first mold surface 310 by fitting the conductive portion 5b and the bus bars 5c, 5d in the recess 310a.

In the next first injection step, with the functional film 52 placed on the first mold surface 310, the first mold 31 and the second mold 33 are closed as shown in FIG. 16. As a result, a first cavity C10 is formed between the first mold 31 and the second mold 33 by the first mold surface 310 and the second mold surface 330. The first cavity C10 is of a plate shape.

Subsequently, the first molten resin including black-colored opaque polycarbonate-based resin is injected into the first cavity C10. As the injected first molten resin is solidified, the transparent body 1 having the first surface 1a and the second surface 1b is made. Then, the functional film 52 is thermally deformed in tight contact with the second surface 1b. Thus, the functional film 52 is fixed to the transparent body 1, so that an intermediate product 18 made by the transparent body 1 and the functional film 52 is produced. Since the functional film 52 is placed on the first mold surface 310 in the placement step, the functional film 5 is fixed at the front surface 50a of the base 5a thereof to the second surface 1b of the transparent body 1 in the intermediate product 18.

In the next second injection step, the first mold 31 and the second mold 33 are opened and then the second mold 33 and the third mold 35 are closed as shown in FIG. 18. As a result, a second cavity C20 is formed between the second mold 33 and the third mold 35 by the second mold surface 330 and the third mold surface 350. The second cavity C20 has the substantially same shape as the plastic window 200 as a final product. It is noted that when the first mold 31 and the second mold 33 are opened, the intermediate product 18 is left as it is in the second cavity C20.

Subsequently in the second injection step, the second molten resin including opaque polycarbonate-based resin is injected into the second cavity C20. As with the first molten resin in the manufacturing method according to the first embodiment, the second molten resin includes opaque resin made mainly of polycarbonate colored black. As the injected second molten resin is solidified, the cover 3 is formed with the intermediate product 18 in an integral manner. That is, the cover 3 is fixed securely to the peripheral edge portion of the second surface 1b of the transparent body 1 so that the front surface 3a of the cover 3 is in contact with the second surface 1b of the transparent body 1. The cover 3 is located more outside than the conductive portion 5b and the bus bars 5c, 5d and fixed to the second surface 1b. The conductive portion 5b and the bus bars 5c, 5d of the cover 3 are exposed. Thus, the plastic window 200 is completed.

As with the plastic window 100 shown in FIG. 1, the mounting between the vehicle and the plastic window 200 is concealed by the cover 3 and, therefore, is not exposed to the exterior of the vehicle. When the conductive portion 5b is energized to be heated, defogging and ice melting of the transparent body 1 can be performed.

In the preparation step of the manufacturing method according to the third embodiment, the functional film 52 is prepared which includes the base 5a, the conductive portion 5b, the bus bars 5c, 5d, and the colored portions 5g, 5h, as shown in FIGS. 13 and 14. The colored portions 5g and 5h are formed on the front surface 50a of the base 5a in an overlapping manner with the bus bars 5c and 5h, respectively. In the plastic window manufactured by the method according to the fourth embodiment, the bus bars 5c, 5d are concealed by the colored portions 5g, 5h without being exposed through the front surface of the base 5a, or the side of the first surface 1a of the transparent body 1, as shown in FIGS. 11 and 12.

In order to prevent the bus bars 5c, 5d from being exposed through the first surface 1a of the transparent body 1, it is conceivable, for example, that the colored opaque portions 5g, 5h are formed by opaque-coloring any desired portion of the first surface 1a. In this case, however, since the colored portions 5g, 5h and the bus bars 5c, 5d need to be provided separately in the transparent body 1 and the functional film 52, respectively, the colored portions 5g, 5h and the bus bars 5c, 5d need to be positioned carefully, thus complicating the manufacturing of the plastic window 200. In the manufacturing method in which the functional film 52 has the colored portions 5g, 5h, positioning of the colored portions 5g, 5h and the bus bars 5c, 5d is not required, which helps facilitate the manufacturing.

Unlike the plastic window 100 manufactured by the manufacturing method according to the first embodiment, in the plastic window 200 manufactured by method according to the third embodiment, the bus bars 5c, 5d do not need to be covered with the cover 3, so that the cover 3 does not need to be formed greater than necessary and, therefore, the injection amount of the second molten resin may be reduced. The other functions of the manufacturing method of the third embodiment are the same as those in the manufacturing method according to the first embodiment.

In the functional film 52 in which the colored portions 5g, 5h are colored with the same color as the cover 3, or black, when the plastic window 200 manufactured by the manufacturing method according to the third embodiment is viewed from the first surface 1a of the transparent body 1, or from the exterior of a vehicle, the colored portions 5g, 5h and the cover 3 are seen in an assimilated state and cooperate to constitute a single shape. As a result, the colored portions 5g, 5h are hardly visible and the plastic window 200 has a good appearance.

In the method for manufacturing a plastic window according to the third embodiment, the functional film prepared in the film preparation step has on the back surface of the base thereof a conductive portion and bus bars and has on the front surface or back surface of the base thereof opaque colored portions. In the placement step, with the back surface of the base in contact with the first mold surface, the functional film is placed on the first mold surface. Therefore, in the intermediate product produced in the first injection step, the second surface of the transparent body is provide with the front surface of the base in an integral manner. In the second injection step, the plastic window in which the cover is formed with the peripheral edge portion of the second surface of the transparent body in an integral manner is produced. In this case, the frame is formed with the conductive portion and the bus bars exposed to the outside.

Since the functional film used in the manufacturing method according to the third embodiment has the base, the conductive portion, and the bus bars, the conductive portion and the bus bars may be formed easily in the transparent body as compared with the method according to which the conductive portion and the bus bars are directly formed on the transparent body. Furthermore, since the functional film has therein the colored portions, the bus bars of the plastic window produced by the method according to the third embodiment are not exposed through the front surface of the base and through the first surface of the transparent body. Therefore, the method according to the third embodiment may dispense with a step for providing a separate cover to the first surface or opaque-coloring the first surface. If the first surface needs to be opaque-colored in an additional step, the colored portions and the bus bars need to be positioned carefully, which complicates the manufacturing of the plastic window. In the manufacturing method according to the third embodiment in which the functional film has therein the colored portions, the plastic window can be manufactured without the need of positioning the colored portions and the bus bars anew.

Furthermore, the cover does not need to cover the bus bars. Therefore, the cover does not need to be formed greater than necessary. As a result, the amount of the second molten resin to be injected in the second injection step can be reduced.

Therefore, in the method for manufacturing the plastic window according to the third embodiment, the conductive portion and the bus bars may be formed easily in the plastic window and the plastic window has a good appearance and the production cost can be reduced.

Fourth Embodiment

Figure 20:
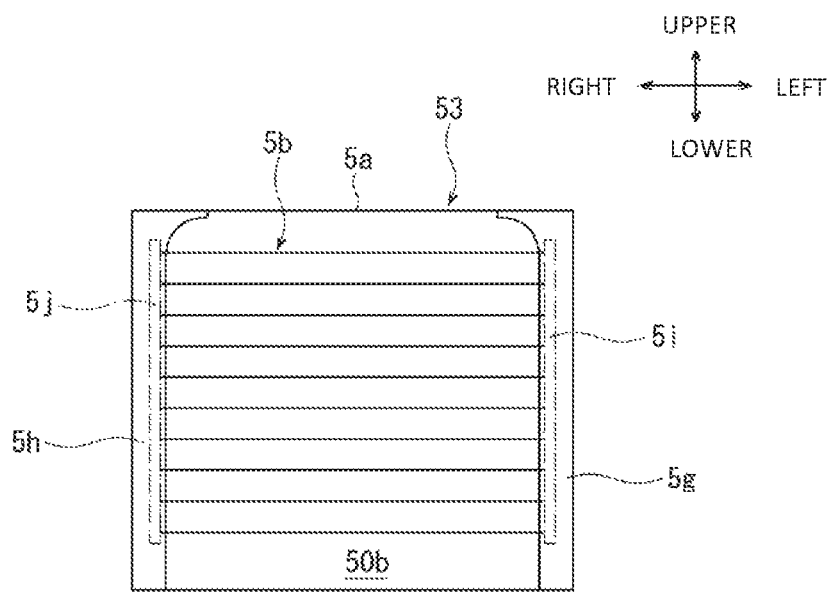
FIG. 20 is a fragmentary rear view of a functional film for a plastic window that is prepared in the film preparation step of a plastic window manufacturing method according to the fourth embodiment of the present invention.

The following will describe a method for manufacturing a plastic window according to a fourth embodiment of the present invention. The fourth embodiment differs from the third embodiment in that a functional film 53 shown in FIG. 20 is prepared in the film preparation step. As with the functional film 52, the functional film 53 includes the base 5a, the conductive portion 5b, and the colored portions 5g, 5h. In the functional film 53, the conductive portions 5b and the colored portions 5g, 5h are formed on the back surface 50b of the base 5a and the bus bar forming portions 5i, 5j are provided on the back surface 50b of the base 5a as shown by the imaginary line in FIG. 20. The bus bar forming portion 5i is located on the left side of the conductive portion 5b in an overlapping manner with the colored portion 5g and the bus bar forming portion 5j is located on the right side of the conductive portion 5b in an overlapping manner with the colored portion 5h. That is, in the film preparation step of the manufacturing method according to the fourth embodiment, the bus bars 5c, 5d are not formed on the functional film 53.

Figure 21:
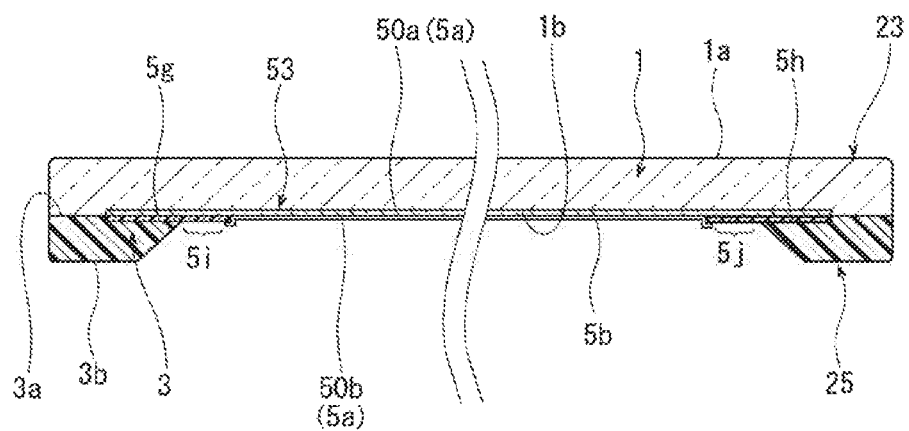
FIG. 21 is a fragmentary sectional view of a second intermediate product of the plastic window manufactured by the plastic window manufacturing method according to the fourth embodiment.

As with the manufacturing method according to the third embodiment, in the placement step, the functional film 53 is placed on the first mold surface 310 and in the first injection step, the first molten resin is injected and the transparent body 1 is produced. Then, the functional film 53 is thermally deformed in tight contact with the second surface 1b. Thus, as shown in FIG. 21, a first intermediate product 23 formed by the transparent body 1 and the functional film 53 is produced. In the first intermediate product 23, the front surface 50a of the base 5a of the functional film 53 is formed with the transparent body 1 in an integral manner.

As with the manufacturing method according to the third embodiment, in the second injection step, the second molten resin is injected and the cover 3 is formed. Thus, a second intermediate product 25 formed by the first intermediate product 23 and the cover 3 is produced. In the second intermediate product 25, the cover 3 is formed with the first intermediate product 23 in an integral manner. Specifically, the cover 3 is integrated with the first intermediate product 23 at the peripheral edge portion of the second surface 1b of the transparent body 1 including the back surface 50b of the base 5a of the functional film 53 with the front surface 3a of the cover 3 in contact with the second surface 1b of the transparent body 1. Although the colored portions 5g, 5h are concealed with the cover 3 on the back surface 50b of the base 5a, the conductive portion 5b and the bus bar forming portions 5i, 5j are located inward of the cover 3 and exposed without being conceived by the cover 3.

After the second intermediate product 25 has been made, the bus bar forming step is performed. As with the manufacturing method according to the 10 second embodiment, in the bus bar forming step, conductive material is applied on the bus bar forming portions 5i, 5j, as a result of which the bus bar 5c is formed on the bus bar forming portion 5i, as shown in FIG. 22. Although not shown in the drawing, the bus bar 5d is formed on the bus bar forming portion 5j. Thus, the plastic window 300 shown in FIG. 21 is completed.

According to the manufactured method of the fourth embodiment, the bus bar 5c is formed on the colored portion 5g on the back surface 50b of the base 5a. Although omitted in the drawing, the same is true of the bus bar 5d. Therefore, as with the plastic window 200 shown in FIG. 12, in the plastic window 300 manufactured by the method according to the fourth embodiment, the bus bars 5c, 5d are concealed by the colored portions 5g, 5h without being exposed through the first surface 1a of the transparent body 1. The other functions in the manufacturing method are the same as those in the manufacturing method according to the third embodiment.

Although the plastic window manufacturing method according to the fourth embodiment is mostly the same as that according to the third embodiment, the functional film prepared in the film preparation step in the fourth embodiment has on the back surface of the base thereof bus bar forming portions. That is, the functional film prepared in the film preparation step of the forth embodiment has no bus bar. Therefore, in the first intermediate product produced in the first injection step, the bus bar forming portions are exposed through the back surface of the base. In the bus bar forming step, the bus bars are formed on the bus bar forming portions, thus a plastic window being produced. The plastic window produced by the manufacturing method according to the fourth embodiment has the same function as the plastic window made according to the method of the above third manufacturing.

The method for manufacturing a plastic window according to the fourth embodiment permits the conductive portion and the bus bars to be easily provided and the plastic window to have a good appearance and the production cost to be reduced.

In a second plastic window according to the resent invention, or the plastic window 200, the functional film has the conductive portion, the bus bars, and the colored portions. The colored portions are opaque-colored. In the plastic window, the functional film is formed with the second surface of the transparent body in an integral manner. As a result, the conductive portion, the bus bars, and the colored portions are formed on the transparent body. Therefore, this plastic window has the same functions as the plastic window produced by the method according to the third and fourth methods.

The methods for manufacturing a plastic window according to the first, second, third and fourth embodiments of the present invention permits the conductive portion and the bus bars to be easily provided, the plastic windows can have a good appearance, and the production cost to be reduced. In the first and 25 second plastic windows according to the present invention, the conductive portion and the bus bars can be easily provided, the plastic windows has a good appearance, and the production cost can be reduced.

The present invention is not limited to the above-described embodiments, but may be modified within the scope of the invention.

For example, the transparent body 1 is not limited to a flat plate shape, but may be of a curved shape.

It may be so configured that the conductive portion 5b emits light when energized by electric current supplied through the bus bars 5c, 5d.

In the film preparation step of the manufacturing method according to the first embodiment, the base of a functional film that is prepared in the preparation step may have a size that is greater than the transparent body 1 and an excess portion of the base 5a may be removed after the second injection step. The same is true for the manufacturing methods according to the second, third, and fourth embodiments.

The functional film 52 may have on the back surface 50b of the base 5a colored portions such as 5g and 5h. In the functional film 53, the colored portions 5g, 5h may be formed on the front surface 50a of the base 5a.

The present invention is applicable to vehicles and buildings.

What is claimed is:

1. A method for manufacturing a plastic window, comprising:
    a mold preparation step for preparing a first mold having a first mold surface, a second mold having a second mold surface and being closed with the first mold to form a first cavity between the first mold surface and the second mold surface, and a third mold having a third mold surface and being closed with the first mold to form a second cavity having a product shape between the first mold surface and the third mold surface;
    a film preparation step for preparing a functional film having a transparent base of a sheet shape, a conductive portion formed on a back surface of the base, and a bus bar formed on the back surface of the base and electrically connectable to the conductive portion, the functional film being thermally deformable;

a placement step for placing the functional film on the first mold surface with the back surface of the base in contact with the first mold surface;

a first injection step, wherein the first mold and the second mold are closed, wherein a first molten resin is injected into the first cavity to form a cover made of solidified opaque resin of the first molten resin, and wherein an intermediate product provided with the cover on a peripheral edge portion of the functional film in an integral manner is made; and a second injection step, wherein the first mold and the second mold are opened, wherein the first mold and the third mold are closed, wherein a second molten resin is injected into the second cavity to form a transparent body made of solidified transparent resin of the second molten resin and having a first surface and a second surface located on an opposite side from the first surface, and wherein a product provided with the intermediate product on a peripheral edge portion of the second surface in an integral manner is made, wherein the first mold surface has a first forming portion forming the back surface of the cover and a second forming portion forming the second surface of the transparent body, and wherein in the placement step, the conductive portion is placed on the second forming portion and the bus bar is placed on the first forming portion.

2. A method for manufacturing a plastic window, comprising:

a mold preparation step for preparing a first mold having a first mold surface, a second mold having a second mold surface and being closed with the first mold to form a first cavity between the first mold surface and the second mold surface, and a third mold having a third mold surface and being closed with the first mold to form a second cavity having a product shape between the first mold surface and the third mold surface;

a film preparation step for preparing a functional film having a transparent base of a sheet shape, a conductive portion formed on a back surface of the base, and a bus bar forming portion formed on the back surface of the base for forming a bus bar electrically connectable to the conductive portion, the functional film being thermally deformable;

a placement step for placing the functional film on the first mold surface with the back surface of the base in contact with the first mold surface;

a first injection step, wherein the first mold and the second mold are closed, wherein a first molten resin is injected into the first cavity to form a cover made of solidified opaque resin of the first molten resin, and wherein a first intermediate product provided with the cover on a peripheral edge portion of the functional film in an integral manner is made;

a second injection step, wherein the first mold and the second mold are opened, wherein the first mold and the third mold are closed, wherein a second molten resin is injected into the second cavity to form a transparent body made of solidified transparent resin of the second molten resin and having a first surface and a second surface located on an opposite side from the first surface, and wherein a second intermediate product provided with the first intermediate product on a peripheral edge portion of the second surface in an integral manner is made; and a bus bar forming step for forming the bus bar on the bus bar forming portion to produce a product, wherein the first mold surface has a first forming portion forming the back surface of the cover and a second forming portion forming the second surface of the transparent body, and wherein in the placement step, the conductive portion is placed on the second forming portion and the bus bar forming portion is placed on the first forming portion.

3. A method for manufacturing a plastic window, comprising:

a mold preparation step for preparing a first mold having a first mold surface, a second mold having a second mold surface and being closed with the first mold to form a first cavity of a plate shape between the first mold surface and the second mold surface, and a third mold having a third mold surface and being closed with the second mold to form a second cavity having a product shape between the second mold surface and the third mold surface;

a preparation step for preparing a functional film having a transparent base of a sheet shape, a conductive portion formed on a back surface of the base, a bus bar formed on the same side as the conductive portion with respect to the base and electrically connectable to the conductive portion, and a colored portion formed on a front surface of the base or the back surface of the base in an overlapping manner with the bus bar and made of opaque color to prevent the bus bar from being exposed to the front surface of the base, the functional film being thermally deformable;

a placement step for placing the functional film on the first mold surface with the back surface of the base in contact with the first mold surface;

a first injection step, wherein the first mold and the second mold are closed, wherein a first molten resin is injected into the first cavity to form a transparent body made of solidified transparent resin of the first molten resin and having a first surface and a second surface located on an opposite side from the first surface, and wherein an intermediate product provided with the transparent body on the front surface of the base of the functional film in an integral manner is made; and a second injection step, wherein the first mold and the second mold are opened, wherein the second mold and the third mold are closed, wherein a second molten resin is injected into the second cavity to form a cover made of solidified opaque resin of the second molten resin with the conductive portion and the bus bar being exposed outside the cover, and wherein a product provided with the cover on a peripheral edge portion of the second surface in an integral manner is made.

4. A method for manufacturing a plastic window, comprising:

a mold preparation step for preparing a first mold having a first mold surface, a second mold having a second mold surface and being closed with the first mold to form a first cavity of a plate shape between the first mold surface and the second mold surface, and a third mold having a third mold surface and being closed with the second mold to form a second cavity having a product shape between the second mold surface and the third mold surface;

a preparation step for preparing a functional film having a transparent base having a sheet shape, a conductive portion formed on a back surface of the base, a bus bar forming portion formed on the back surface of the base for forming a bus bar electrically connectable to the conductive portion, and a colored portion formed on a front surface of the base or the back surface of the base in an overlapping manner with the bus bar forming portion and made of opaque color to prevent the bus bar from being exposed to the front surface of the base, the functional film being thermally deformable;

a placement step for placing the functional film on the first mold surface with the back surface of the base in contact with the first mold surface;

a first injection step, wherein the first mold and the second mold are closed, wherein a first molten resin is injected into the first cavity to form a transparent body made of solidified transparent resin of the first molten resin and having a first surface and a second surface located on an opposite side from the first surface, and wherein a first intermediate product provided with the transparent body on the front surface of the base of the functional film in an integral manner is made;

a second injection step, wherein the first mold and the second mold are opened, wherein the second mold and the third mold are closed, wherein a second molten resin is injected into the second cavity to form a cover made of solidified opaque resin of the second molten resin with the conductive portion and the bus bar being exposed outside the cover, and wherein a second intermediate product provided with the cover on a peripheral edge portion of the second surface in an integral manner is made; and a bus bar forming step for forming the bus bar on the bus bar forming portion to produce a product.

* * * * *